Dec. 30, 1924.
J. O. ARSENAULT
1,521,268
SCREW DRIVER
Filed Dec. 3, 1923        2 Sheets-Sheet 1
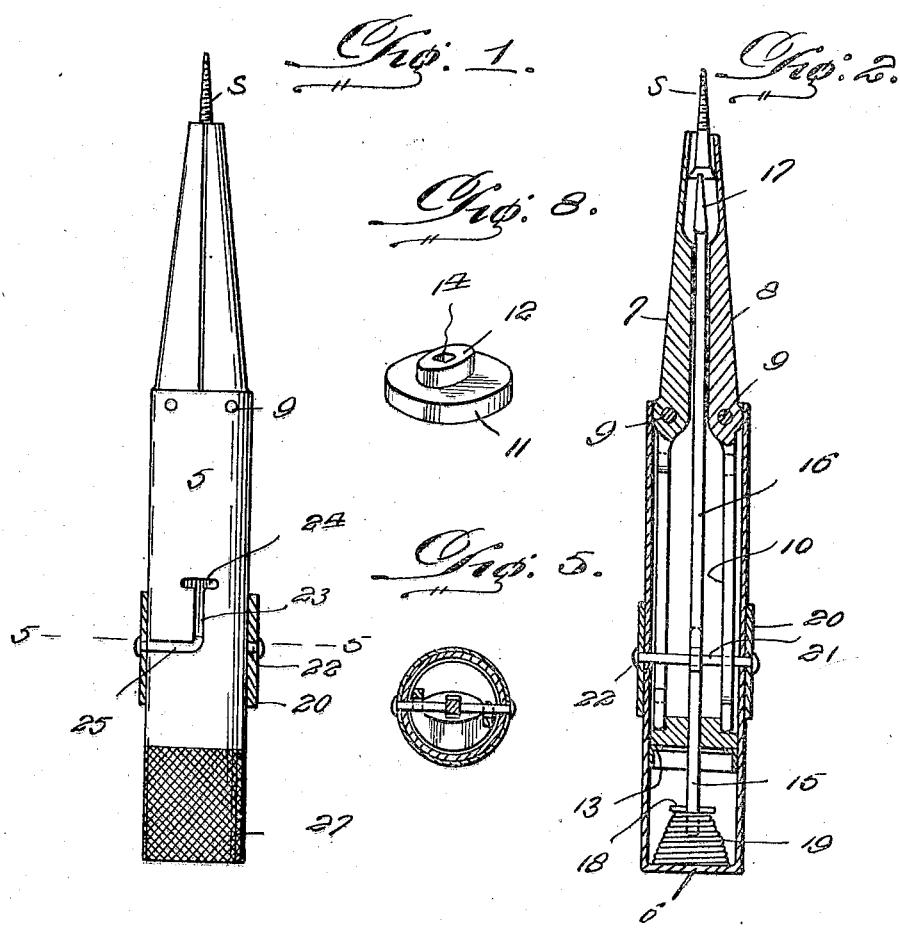

Dec. 30, 1924.

J. O. ARSENAULT

SCREW DRIVER

Filed Dec. 3, 1923

John O Arsenault,
Inventor

By
Attorney

Patented Dec. 30, 1924.

1,521,268

UNITED STATES PATENT OFFICE.

JOHN O. ARSENAULT OF DETROIT, MICHIGAN.

SCREW DRIVER.

Application filed December 3, 1923. Serial No. 678,226.

*To all whom it may concern:*

Be it known that I, JOHN O. ARSENAULT, a subject of the King of Great Britain, residing at Detroit, in the county of Wayne and State of Michigan, U. S. A., have invented certain new and useful Improvements in Screw Drivers, of which the following is a specification.

This invention relates to certain new and useful improvements in screw drivers and has particular reference to screw drivers of that type embodying screw holding means through the use of which a screw may be held into engagement with the bit of the screw driver for facilitating starting of the screw into the work.

The primary object of the invention is to provide a screw driver of the above type, which embodies simplicity and durability of construction, as well as efficiency in operation.

Another object of the invention is to provide a screw driver including a shank provided with a driving bit, pivoted side jaws having means for swinging the same into engagement with the screw for holding the latter in engagement with the bit of the screw driver shank when the latter is retracted relative to the jaws, the retracting means for the bit carrying shank being operable for projecting the latter beyond the outer ends of the jaws for proper turning of the screw after being partially threaded into the work.

Still another object of the invention is to provide novel means including a single operating element adapted to be manipulated in two ways or directions for respectively retracting or projecting the bit carrying shank and opening or closing the screw gripping jaws.

Still another object of the invention is to provide means operatively associated with the operating element by means of which the bit carrying shank is retracted or projected and the jaws opened or closed for positively preventing longitudinal movement of the bit after the same has been set in retracted or projected position.

Other objects will appear as the nature of invention is better understood, and the same consists in the novel form, combination and arrangement of parts hereinafter more fully described, shown in the accompanying drawings and claimed.

In the drawings, wherein like reference characters indicate corresponding parts throughout the several views:

Figure 1 is a side elevational view of a screw driver constructed in accordance with the present invention, but with its bit retracting ring shown in section to reveal details, the bit carrying shank being retracted, and the gripping jaws being in gripping engagement with a screw engaged by the bit.

Figure 2 is a substantially central longitudinal sectional view of the device shown in Figure 1.

Figure 5 is a transverse sectional view, taken upon the line 5—5 of Figure 4.

Figure 6 is a perspective view of the bit operating ring.

Figure 8 is a perspective view of the jaw closing cam disc and

Figure 9:
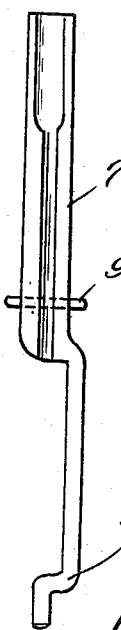
Figure 9 is an inside elevational view of one of the gripping jaws.

Referring more in detail to the drawings, the present invention embodies a hollow cylindrical casing 5 that forms the handle of the screw driver and that is closed at its outer end by means of a wall 6, the inner end of the casing being open. A pair of jaws 7 and 8 are disposed in opposed relation co-extensive with the open end of the casing 5 and have their inner ends pivoted as at 9 upon parallel transverse axes to the open end of the casing 5 and within the latter. These jaws have inwardly projecting arms 10, the central portions of which are laterally offset as shown in Figure 9 for a purpose which will presently become apparent and the inner edge of which engage the inner surface of a disc 11 that is suitably rotatably mounted within the casing 5 and that is formed upon its inner face with a central cam lug 12 against the sides of which the inner ends of the jaw arms 10 bear. For maintaining the disc 11 into engagement with the ends of the arms 10, suitable means such as a flange 13 may be fixed interiorly of the casing 5. The disc 11 is provided with a central polygonal opening 14 through which slidably projects the similarly formed polygonal inner end portion 15 of a screw driver shank 16, the outer end portion of which is formed to provide a driving bit 17 for engagement within the usual kerf provided in the head of the screw S. The inner end of the shank 16 is provided with a cross pin 18 between which and the end wall 6 of the casing 5 is interposed a compression spring 19, whereby said spring normally acts to project the screw driver shank and bit outwardly of the casing to the position shown in Figure 4, wherein the head of the screw is disposed beyond the outer ends of the jaws 7 and 8.

Figure 3:
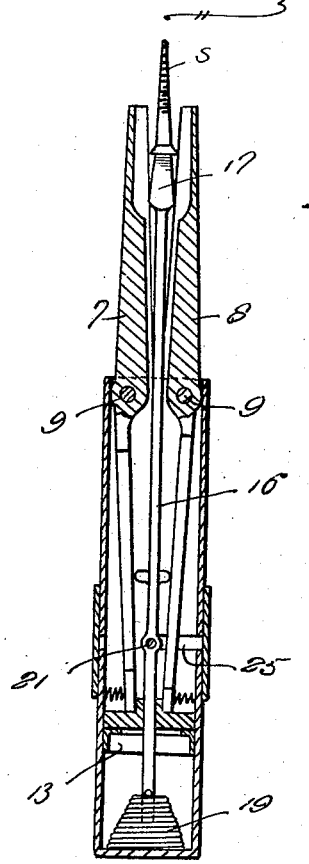
Figure 3 is a view similar to Figure 2 with the jaws in opened position.
Figure 4:
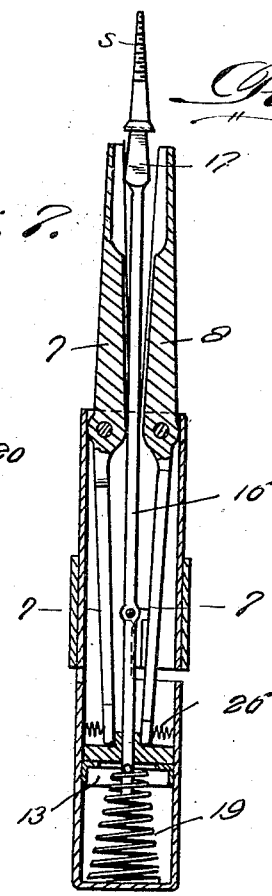
Figure 4 is a view similar to Figure 3 with the bit carrying shank projected.

A ring or sleeve 20 is slidably and rotatably fitted upon the casing 5, and a cross pin 21 has its ends suitably fixed in opposite sides of the ring 20 by riveting or the like as at 22, the cross pin 21 extending through the casing and through an opening provided in the shank 16 between the disc 11 and the jaws 7 and 8. Formed in opposite sides of the casing 5 are longitudinal slots 23 that communicate at their outer ends with cross slots 24 provided in the casing 5, and that communicate at their inner ends with oppositely extending lateral slots 25 also provided in the casing 5. The pin 21 extends thru the casing 5 so as to be movable in the slot when the sleeve or ring 20 is rotated or slid longitudinally with respect to the casing 5 and the arrangement is such that when the ring 20 is moved inwardly, the pin 21 will be aligned with the lateral slot 25 so that a subsequent rotation of the ring 20 is permitted for holding the shank 16 retracted against the action of the spring 19 with the bit 17 disposed between the opposed faces of the outer ends of the jaws 7 and 8. The arrangement is also such as to permit the pin 21 to ride outwardly in the longitudinal slot 23 until the pin 21 is aligned with the cross slot 24 so that a subsequent partial rotation of the ring 20 will move the pins into either end of the cross slots 24 for effectively holding the shank 16 projected with the bit 17 beyond the outer ends of the jaws 7 and 8 as shown in Figure 4, it being noted that the shank 16 is projected by the spring 19 when the pin 21 is aligned with the slot 23. It is further noted that by reason of the fact that the pin 21 extends through the shank 16 and by reason of the fact that the squared portion 15 of the shank 16 is slidably keyed to the disc 11, the movement of the shank 16 longitudinally relative to the disc 11 is permitted, but when the ring 20 is rotated, a similar movement is imparted to the disc 11, whereby when the pin 21 rides into the lateral slot 25, the cam 12 of the disc 11 forces the arms 10 apart, so as to cause the jaws 7 and 8 to move toward each other into gripping engagement with opposite sides of the screw S that is engaged with the bit 17 positioned between said jaws. On the other hand, the construction is such that when the pin 21 is positioned in the slot 23 or at either of the ends of the short cross slot 24, the disc 11 will be positioned so that the cam 12 lies in proper relation to the arms 10 for permitting the latter to swing toward each other, and allowing the jaws 7 and 8 to separate as shown in Figures 3 and 4.

Figure 7:
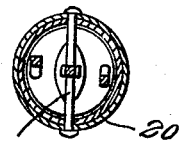
Figure 7 is a transverse sectional view taken substantially upon the line 7—7 of Figure 4.

For the purpose of normally causing movement of the arms 10 toward each other for separating the jaws 7 and 8, suitable compression springs 26 may be interposed between the inner ends of the arms 10 and the adjacent sides of the casing 5. The offset portions of the arms 10 permit rotation of the ring 20 for a quarter turn, so that the pin 21 may move from the position shown in Figure 7 to the position shown in Figure 5, as is necessary in the operation of the device.

By means of a screw driver of this kind, a screw may be effectively held in engagement with the bit 17 without requiring the use of the operator's hand for this purpose, such as when initially starting the screw into a piece of work, particularly when the work is not readily accessible. On the other hand, the device embodies means for permitting the bits to be projected from between the jaws so that the screw may be entirely driven into the work without obstruction as illustrated in Figure 4. The entire operation of the device merely involves the operation of the single element 20 either by a sliding or rotating movement or both, for effecting the retraction or rejection of the bit carrying shank and opening or closing of the jaws which grip the screws. When the implement is in use in rotating the screw for driving the latter into the work, the casing 5 is turned by using the latter as a handle, and in order that the same may be more readily turned, the closed end portion of the latter may be roughened or serrated as generally indicated at 27. The outer surface of the ring 20 may also be roughened or milled as shown in Figure 6 for the same purpose, and the spring 19 is preferably of conical coil form as shown for more efficient operation and durability.

From the foregoing description, it is believed that the construction and operation as well as the advantages of the present invention will be readily understood and appreciated by those skilled in the art.

What I claim as new is:

1. In a screw driver of the character described, a pair of opposed pivoted screw engaging jaws, a shank slidably and rotatably mounted between the jaws and having a bit upon its outer end, means including an operating member movable longitudinally with the shank to retract or project the latter for positioning its bit either between or beyond the outer ends of said jaws, said means being also rotatable about the shank for swinging the jaws toward or from each other to grip or release a screw engaged by the bit, a hollow cylindrical casing to which the inner ends of the jaws are pivoted, said shank extending axially in said casing, and said rotatable and slidable member being mounted upon said casing.

2. In a screw driver of the character described, a pair of opposed pivoted screw gripping jaws, a shank slidably and rotatably mounted between the jaws and having a driving bit on its outer end, means including an operating member movable longitudinally with the shank for causing swinging movement of the jaws toward or away from each other to grip or release a screw engaged by the bit and rotatable about the shank to retract or project the latter for positioning its bit respectively between or beyond the outer ends of the jaws, a hollow cylindrical casing to which the inner ends of the jaws are pivoted and axially of which the shank extends, said rotatable and slidable member being mounted upon said casing, and comprising a sleeve, the jaw operating and bit retracting and projecting means further including a cross pin carried by the sleeve, said casing having opposed lateral and longitudinal slots in which said cross pin is movable for permitting rotation of the sleeve and preventing longitudinal movement of the bit carrying shank from either its projected or retracted position when the cross pin of the sleeve is engaged in the lateral slot of the casing.

3. In a screw driver of the type specified, a hollow cylindrical casing for the handle, a pair of opposed screw engaging jaws pivoted at their inner ends to the outer end of said casing, said jaws extending beyond said outer end and being provided with integral arms extending into the interior of the casing, a cam disk rotatable in the casing, the inner ends of said arms being engageable with said cam, a shank disposed within said casing and having its outer end projecting beyond the corresponding end of the latter, said outer end being formed into a bit for engaging a screw, said shank being rotatable and slidable with respect to said casing, a spring associated with the inner end of the shank for projecting the bit outwardly beyond the outer ends of said jaws, a sleeve surrounding said casing, and a bayonet slot and pin connection between the sleeve and casing, said pin being connected with said shank for rotating the latter to permit projection and retraction thereof, the shank being keyed to said disk for rotating the latter when the sleeve is rotated for opening and closing said jaws.

In testimony whereof I affix my signature.

JOHN O. ARSENAULT.